(No Model.)

E. C. ATKINS.
BAND SAW.

No. 339,728. Patented Apr. 13, 1886.

WITNESSES.
Chas. N. Leonard.
Charles L. Thurber.

INVENTOR.
Elias C. Atkins,
PER
C. Bradford,
ATTORNEY.

N. PETERS, Photo-Lithographer, Washington, D. C.

United States Patent Office.

ELIAS C. ATKINS, OF INDIANAPOLIS, INDIANA.

BAND-SAW.

SPECIFICATION forming part of Letters Patent No. 339,728, dated April 13, 1886.

Application filed February 24, 1886. Serial No. 193,004. (No model.)

*To all whom it may concern:*

Be it known that I, ELIAS C. ATKINS, of the city of Indianapolis, county of Marion, and State of Indiana, have invented certain new and useful Improvements in Band-Saws, of which the following is a specification.

The object of my said invention is to so construct a band-saw that it will remain or be held upon the wheels over which it runs by its own formation, aided by the corresponding formation of said wheels. This object is accomplished by making the saw convex or thicker in the middle or central portion than at the edges, and the face of the wheels over which it runs correspondingly concave.

Figure 1:
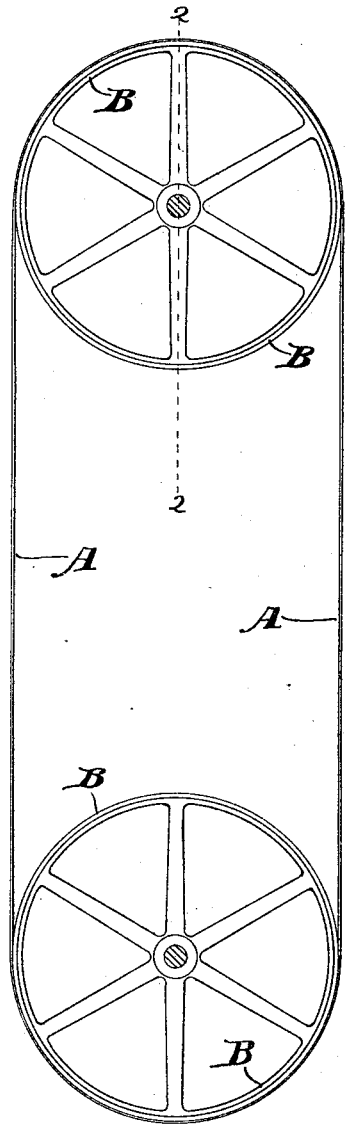
Figure 2:
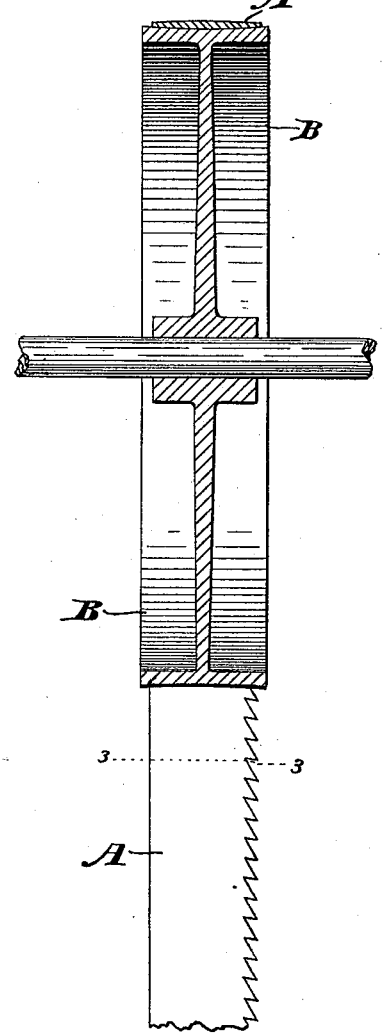
Figure 3:

Referring to the accompanying drawings, which are made a part hereof, and on which similar letters of reference indicate similar parts, Figure 1 is a side elevation of a set of band-saw wheels and the saw thereon; Fig. 2, a vertical sectional view on the dotted line 2 2 in Fig. 1, on an enlarged scale; and Fig. 3, a transverse section of the saw on the dotted line 3 3 in Fig. 2, on a still further enlarged scale.

In said drawings, the portions marked A represent the band-saw, and B the band-saw wheels.

The band-saw A, as before stated, is convex or thicker in the middle than at the edges, and the wheels B are concave or lower at the central point than at the edges. This formation, as will be readily understood, when the saw is drawn tight around the wheels, prevents it from being pushed off said wheels by the strain and pressure incident to the work, as it is evident that the saw cannot pass over the edges of the wheels when formed in this manner.

The increased thickness in the center of the saw necessary to accomplish the result sought is but slight, and therefore it is entirely practicable to form saws in this manner and still have them do efficient work, as the teeth can be set sufficiently to produce an ample kerf in the lumber for the passage of the saw.

Having thus fully described my said invention, what I claim as new, and desire to secure by Letters Patent, is—

1. A band-saw formed convex or thicker in the middle or central portion than at the edges, substantially as shown and described.

2. The combination of the band-saw, formed thicker in the middle than at the edges, and saw-supporting wheels formed concave upon their bearing-surfaces, substantially as set forth.

In witness whereof I have hereunto set my hand and seal, at Indianapolis, Indiana, this 20th day of February, A. D. 1886.

ELIAS C. ATKINS. [L. S.]

In presence of—
 C. BRADFORD,
 CHARLES L. THURBER.